(12) United States Patent
Bedini

(10) Patent No.: US 6,545,444 B2
(45) Date of Patent: Apr. 8, 2003

(54) DEVICE AND METHOD FOR UTILIZING A MONOPOLE MOTOR TO CREATE BACK EMF TO CHARGE BATTERIES

(75) Inventor: John C. Bedini, Coeur d'Alene, ID (US)

(73) Assignee: Bedini Technology, Inc., Coeur D'Alene, ID (US)

( * ) Notice: Subject to any disclaimer, the term of this patent is extended or adjusted under 35 U.S.C. 154(b) by 0 days.

(21) Appl. No.: 09/805,762

(22) Filed: Mar. 13, 2001

(65) Prior Publication Data

US 2002/0130633 A1 Sep. 19, 2002

(51) Int. Cl.$^7$ ................................................. H02P 5/28
(52) U.S. Cl. .................... 318/798; 318/434; 318/138; 318/801; 318/802; 318/364; 318/139; 318/146; 318/806; 318/459
(58) Field of Search .................... 318/798, 434, 318/138, 801, 802, 364, 134, 146, 806, 459; 388/928.1

(56) References Cited

U.S. PATENT DOCUMENTS

| 2,279,690 A | 4/1942 | Lindsey |
| 4,055,789 A | 10/1977 | Lasater |
| 4,893,067 A | * 1/1990 | Bhagwat et al. ............. 318/599 |
| 5,377,094 A | * 12/1994 | Williams et al. ............. 318/434 |
| 6,037,728 A | * 3/2000 | Petkovic ........................ 318/139 |
| 6,116,368 A | * 9/2000 | Lyons et al. ................. 180/165 |

FOREIGN PATENT DOCUMENTS

| EP | 0 573 065 | 12/1993 |
| WO | WO 94/17582 | 8/1984 |

OTHER PUBLICATIONS

International Search Report, Jul. 23, 2002.

* cited by examiner

Primary Examiner—Karen Masih
(74) Attorney, Agent, or Firm—Graybeal Jackson Haley LLP

(57) ABSTRACT

A back EMF monopole motor and method using a rotor containing magnets all of the same polarity and in a monopole condition when in momentary apposition with a magnetized pole piece of a stator having the same polarity, said stator comprised of a coil with three windings: a power-coil winding, a trigger-coil winding, and a recovery-coil winding. The back EMF energy is rectified using a high voltage bridge, which transfers the back EMF energy to a high voltage capacitor for storage in a recovery battery. The stored energy can then be discharged across the recovery battery through the means of a contact rotor switch for further storage.

10 Claims, 3 Drawing Sheets

DEVICE AND METHOD FOR UTILIZING A MONOPOLE MOTOR TO CREATE BACK EMF TO CHARGE BATTERIES

TECHNICAL FIELD

The invention relates generally to the capturing of available electromagnetic energy using a device and method for creating an electromagnetic force (hereinafter, EMF) and then using the available stored energy for recycling into the system as stored energy. The method of creating back EMF is the result of coupling/uncoupling a voltage source to and from a coil.

BACKGROUND

Operation of present day normal magnetic motors has the rotor pole attracting the stator pole, resulting in the generation of mechanical power from the magnets to the rotor and flywheel. During this phase, energy flows from the magnetics to the rotor/flywheel and is stored as kinetic energy in the increased rotation. A rotor pole leaving a stator pole and creating a condition of "drag" results in power having to be put back into the magnetic section by the rotor and flywheel to forcibly overcome the drag. In a perfect, friction-free motor, the net force field is therefore referred to as "most conservative". A most conservative EMF motor has maximum efficiency. Without extra energy continually fed to the motor, no net work can be done by the magnetic field, since half the time the magnetic field adds energy to the load (the rotor and flywheel) and the other half of the time it subtracts energy back from the load (the rotor and flywheel). Therefore, the total net energy output is zero in any such rotary process without additional energy input. To use a present day magnetic motor, continuous energy must be input into the motor to overcome drag and to power the motor and its load.

Motors and generators presently in use, all use such conservative fields and therefore, have internal losses. Hence, it is necessary to continually input all of the energy that the motor outputs to the load, plus more energy to cover losses inside the motor itself. EMF motors are rated for efficiency and performance by how much energy "input" into the motor actually results in "output" energy to the load. Normally, the Coefficient of Performance (hereinafter, COP) rating is used as a measure of efficiency. The COP is the actual output energy going into the load and powering it, divided by the energy that must be input into the device with its motor/load combination. If there were zero internal losses in a motor, that "perfect" motor would have a COP equal to 1.0. That is, all energy input into the motor would be output by the motor directly into the load, and none of the input energy would be lost or dissipated in the motor itself.

In magnetic motor generators presently in use, however, due to friction and design flaws, there are always internal losses and inefficiencies. Some of the energy input into the motor is dissipated in these internal losses. As a consequence, the energy that gets to the load is always less than the input energy. So a standard motor operates with a COP of less than 1.0, which is expressed as COP<1.0. An inefficient motor may have a COP=0.4 or 0.45, while a specially designed, highly efficient motor may have a COP=0.85.

The conservative field inside of a motor itself is divided into two phases. Producing a conservative field involves net symmetry between the "power out" phase from the magnetics to the rotor/flywheel and the "power back in" phase from the rotor/flywheel back to the magnetics. That is, the two flows of energy (one from the magnetics into the rotor and flywheel, and one from the rotor and flywheel back to the magnetics) are identical in magnitude but opposite in direction. Each phase alone is said to be "asymmetrical", that is, it either has: 1) a net energy flow out to the rotor/flywheel; or 2) a net energy flow back into the magnetics from the rotor/flywheel. In simplified terms, it is referred to as "power out" and "power back in" phases with respect to the motor magnetics.

For the power-out phase, energy is derived from the EMF existing between the stator pole and incoming rotor pole in an attraction mode. In this phase, the rotary motion (angular momentum and kinetic energy) of the rotor and flywheel is increased. In short, power is added to the rotor/flywheel (and thus to the load) from the fields between stator pole and rotor pole (the electromagnetic aspects of the system).

For the "power back in" phase, energy must be fed back into the magnetics from the rotor and flywheel (and the load) to overcome the drag forces existing between stator pole and outgoing rotor pole. In this phase, energy is returned back to the internal magnetic system from the rotary motion of the rotor and flywheel (the angular momentum, which is the rotational energy×time). As is well known in physics, a rotor/flywheel's angular momentum provides a convenient way to store energy with the spinning rotor/flywheel mass acting as an energy reservoir.

Most present day conventional magnetic motors use various methods for overcoming and partially reversing back EMF. Back EMF may be defined as the return pulse from the coil out of phase and is the result of regauging, which is the process of reversing the magnetics polarity, that is, form North to South, etc. The back EMF is shorted out and the rotor is attracted back in, therefore eliminating drag. This can be accomplished by pouring in more energy, which overpowers the back EMF, thereby producing a forward EMF in that region. The energy required for this method is furnished by the operator.

It is well known in the art that changing the voltage alone creates a back EMF and requires no work. This is because to change the potential energy does not require changing the form of that potential energy, but only its magnitude. Work is the changing of the form of energy. Therefore, as long as the form of the potential energy is not changed, the magnitude can be changed without having to perform work in the process. The motor of the present invention takes advantage of this permissible operation to create back EMF asymmetrically, and thereby change its own usable available potential energy.

In an electric power system, the potential (voltage) is changed by inputting energy to do work on the internal charges of the generator or battery. This potential energy is expended within the generator (or battery) to force the internal charges apart, forming a source dipole. Then the external closed circuit system connected to that source dipole ineptly pumps the spent electrons in the ground line back through the back EMF of the source dipole, thereby scattering the charges and killing the dipole. This shuts off the energy flow from the source dipole to the external circuit. As a consequence of this conventional method, it is a requirement to input and replace additional energy to again restore the dipole. The circuits currently utilized in most electrical generators have been designed to keep on destroying the energy flow by continually scattering all of the dipole charges and terminating the dipole. Therefore, it is necessary to keep on inputting energy to the generator to keep restoring its source dipole.

A search of prior art failed to reveal any monopole motor devices and methods that recycle available energy from back EMF to charge a battery or provide electrical energy for other uses as described in the present invention. However, the following prior art patents were reviewed:

U.S. Pat. No. 4,055,789 to Lasater, Battery Operated Motor with Back EMF Charging.

U.S. Pat. No. 2,279,690 to Z. T. Lindsey, Combination Motor Generator.

SUMMARY OF THE INVENTION

An aspect of the device and method of the present invention is a new monopole electromagnetic motor that captures back EMF energy. The captured back EMF energy maybe used to charge or store electrical energy in a recovery battery. The amount of energy recoverable, as expressed in watts, is dependent upon the configuration, circuitry, switching elements and the number and size of stators, rotors, magnets and coils that comprise the motor.

The motor uses a small amount of energy from a primary battery to "trigger" a larger input of available energy by supplying back EMF, thus increasing the potential energy of the system. The system then utilizes this available potential energy to reduce or reverse the back EMF, thereby increasing the efficiency of the motor and, therefore, the COP.

If the energy in phase 1 (the power-out phase) is increased by additional available energy in the electromagnetics themselves, then the energy in phase 1 can be made greater than the energy in phase 2 (the power-back-in phase) without the operator furnishing the energy utilized. This produces a non-conservative net field. Net power can then be taken from the rotating stator and flywheel, because the available energy added into the stator and flywheel by the additional effects is transformed by the rotor/flywheel into excess angular momentum and stored as such. Angular momentum is conserved at all times; but now some of the angular momentum added to the flywheel is evoked by additional effects in the electromagnetics rather than being furnished by the operator.

That is, the motor deliberately creates a back EMF itself and its potential energy once at a time, thereby retaining each extra force for a period of time and applying it to increase the angular momentum and kinetic energy of the rotor and flywheel. Specifically, this back EMF energy with its net force is deliberately applied in the motor of the present invention to overcome and even reverse the conventional drag-back (the back EMF). Hence less energy must be taken from the rotor and flywheel to overcome the reduced back EMF, and in the ideal case none is required since the back EMF has been overpowered and converted to forward EMF by the back EMF energy and force. In the motor, the conventional drag section of the magnetics becomes a forward-EMF section and now adds energy to the rotor/flywheel instead of subtracting it. The important feature is that the operator only pays for the small amount of energy necessary to trigger the back EMF from the primary battery, and does not have to furnish the much larger back EMF energy itself.

When the desired energy in phase 1 (the power out phase) is thus made greater than the undesired drag energy in phase 2, then part of the output power normally dragged from the rotor and flywheel by the fields in phase 2 is not required. Hence, additional power compared to the system (without the special back EMF mechanisms) is available from the rotor/flywheel. The rotor maintains additional angular momentum and kinetic energy, compared to a system, which does not produce back EMF itself. Consequently, the excess angular momentum retained by the rotor and flywheel can be utilized as additional shaft power to power an external load connected to the shaft.

In the motor, several known processes and methods are utilized which allow the motor to operate periodically as an open dissipative system (receiving available excess energy from back EMF) far from thermodynamic equilibrium, whereby. it produces and receives its excess energy from a known external source.

A method is utilized to temporarily produce a much larger source of available external energy around an energized coil. Design features of this new motor provide a device and method that can immediately produce a second increase in that energy concurrently as the energy flow is reversed. Therefore, the motor is capable of producing two asymmetrical back EMFs, one after the other, of the energy within a single coil, which dramatically increases the energy available and causes that available excess energy to then enter the circuit impulsively, being collected and utilized.

The motor utilizes this available excess back EMF energy to overcome and even reverse the drag EMF between stator pole and rotor pole, while furnishing only a small trigger pulse of energy from a primary battery necessary to control and activate the direction of the back EMF energy flow.

By using a number of such dual asymmetrical self back EMFs for every revolution of the rotor, the rotor and flywheel collectively focus all the excess impulsive inputs into increased angular momentum (expressed as energy× time), shaft torque, and shaft power.

Further, some of the excess energy deliberately generated in the coil by the utilization of the dual process manifests in the form of excess electrical energy in the circuit and can be utilized to charge a recovery battery(s). The excess energy can also be used to power electrical loads or to power the rotor and flywheel, with the rotor/flywheel also furnishing shaft horsepower for powering mechanical loads.

The motor utilizes a means to furnish the relatively small amount of energy from a primary battery to initiate the impulsive asymmetrical self back EMF actions. Then part of the available excess electrical power drawn off from back EMF created energy is utilized to charge a recovery battery with dramatically increased over-voltage pulses.

Design features of this monopole motor utilize one magnetic pole of each rotor and stator magnet. The number of impulsive self-back EMF in a single rotation of the rotor is doubled. Advanced designs can increase the number of self-back EMFs in a single rotor rotation with the result that there is an increase in the number of impulses per rotation, which increase the power output of this new motor.

The sharp voltage spike produced in the coil of this monopole motor by the rapidly collapsing field in the back EMF coil is connected to a recovery battery(s) in charge mode and to an external electrical load. The net result is that the coil asymmetrically creates back EMF itself in a manner adding available energy and impulse to the circuit. The available energy collected in the coil is used to reverse the back-EMF phase of the stator-rotor fields to a forward EMF condition, impulsively adding acceleration and angular momentum to the rotor and flywheel. The available back EMF energy collected in the coil is used to charge a battery. Loads can then be drawn off the battery.

A device and method in which the monopole motor alters the reaction cross section of the coils in the circuit, which momentarily changes the reaction cross section of the coil in which it is invoked. Thus, by this new motor using only a small amount of current in the form of a triggering pulse, it is able to evoke and control the immediate change of the coil's reaction cross section to this normally wasted energy-flow component. As a result, the motor captures and directs some of this usually wasted available environmental energy, collecting the available excess energy in the coil and then releasing it for use in the motor. By timing and switching, the innovative gate design in this new motor directs the available excess energy so that it overcomes and reverses the return EMF of the rotor-stator pole combination during what would normally be the back EMF and demonstrates the creation of the second back EMF of the system. Now instead of an "equal retardation" force being produced in the back EMF region, a forward EMF is produced that is additive to the rotor/flywheel energy and not subtractive. In short, it further accelerates the rotor/flywheel.

This results in a non-conservative magnetic field along the rotor's path. The line integral of the field around that path (i.e., the net work on the rotor/flywheel to increase its energy and angular momentum) is not zero but a significant amount. Hence, the creation of an asymmetrical back EMF impulse magnetic motor: 1) takes its available excess energy from a known external source, the huge usually non-intercepted portion of the energy flow around the coil; 2) further increases the source dipolarity by this back EMF energy; and 3) produces available excess energy flow directly from the source dipole's increased broken symmetry in its fierce energy exchange with the local vacuum.

By operating as an open dissipative system not in thermodynamic equilibrium with the active vacuum, the system can permissibly receive available energy from a known environmental source and then output this energy to a load. As an open dissipative system not in thermodynamic equilibrium, this new and unique monopole motor can tap in on back EMF to energize itself, loads and losses simultaneously, fully complying with known laws of physics and thermodynamics.

DETAILED DESCRIPTION OF THE INVENTION

An embodiment of the present invention is a device and method for a monopole back EMF electromagnetic motor. As described in the Summary of the Invention, this monopole motor conforms to all applicable electrodynamic laws of physics and is in harmony with the law of the conservation of energy, the laws of electromagnetism and other related natural laws of physics.

The monopole back EMF electromagnetic motor comprises a combination of elements and circuitry to capture available energy (back EMF) in a recovery element, such as a capacitor, from output coils. The available stored energy in the recovery element is used to charge a recovery battery.

As a starting point and an arbitrary method in describing this device, the flow of electrical energy and mechanical forces will be tracked from the energy's inception at the primary battery to its final storage in the recovery battery.

Figure 1:
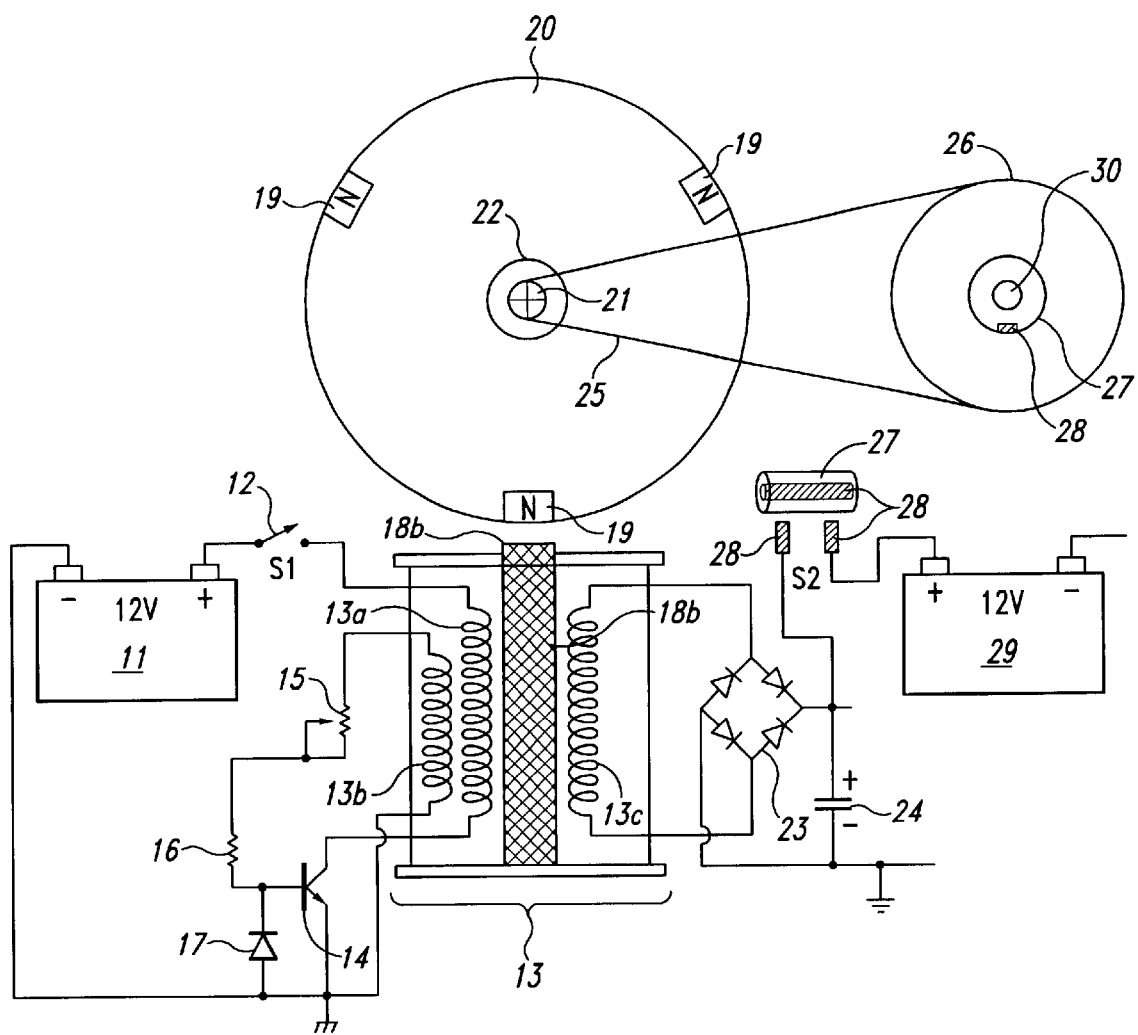
FIG. 1 is a perspective side view of a monopole back EMF motor with a single stator and a single rotor.
Figure 2:
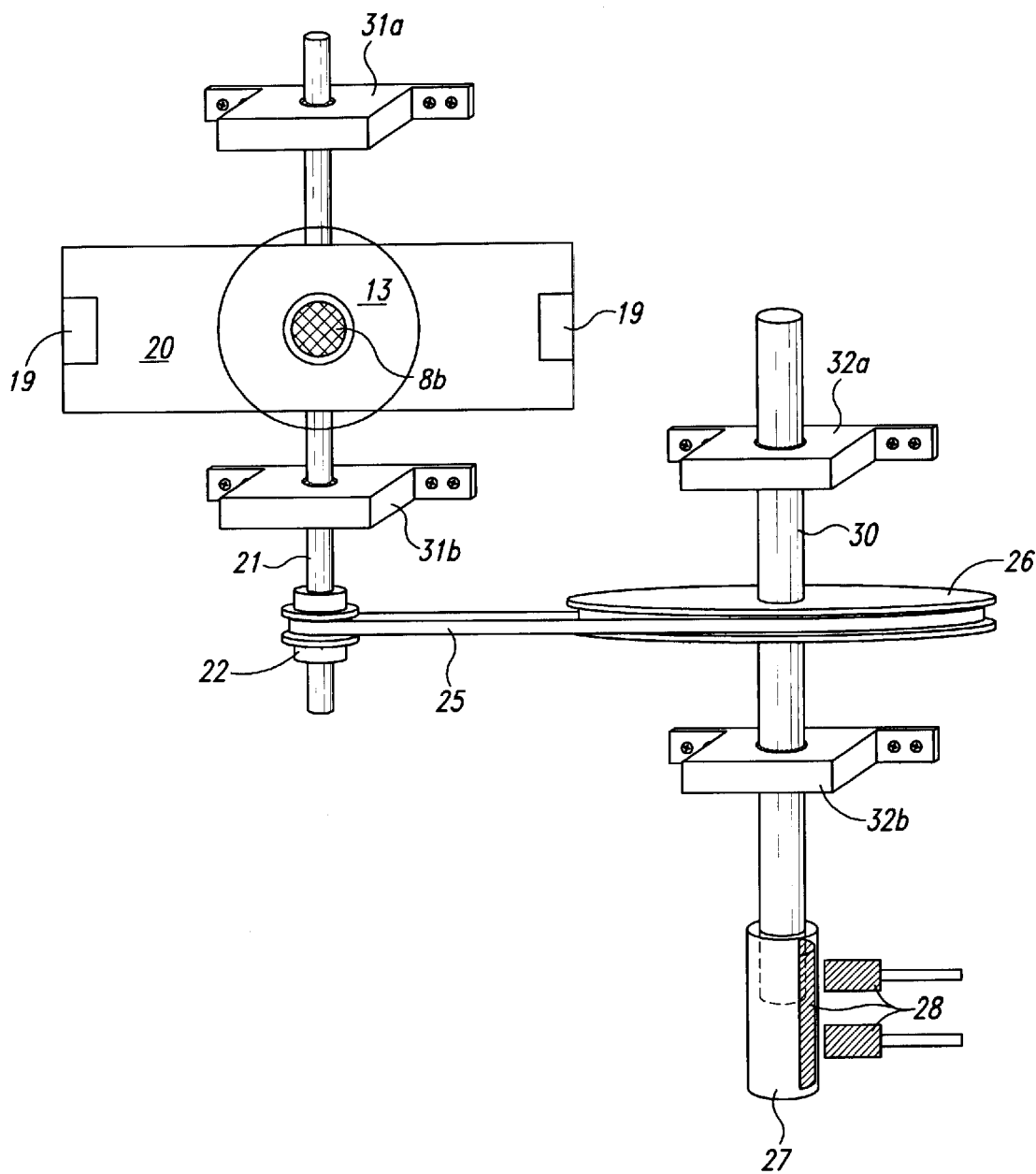
FIG. 2 is a perspective top view of a monopole back EMF motor with a single stator and a single rotor.

FIG. 1 is a perspective side view of the monopole motor according to an embodiment of the invention. As shown in FIG. 1, electrical energy from primary battery 11 periodically flows through power switch 12 and on to and through power-coil wiring 13a. In one embodiment, power switch 12 is merely an On-Off mechanical switch and is not electronic. However, the switch 12 may be a solid-state switching circuit, a magnetic Reed switch, a commutator, an optical switch, a Hall switch, or any other conventional transistorized or mechanical switch. Coil 13 is comprised of three windings: power-coil winding 13a, trigger-coil winding 13b, and recovery-coil winding 13c. However, the number of windings can be more or fewer than three, depending upon the size of the coil 13, size of the motor and the amount of available energy to be captured, stored and used, as measured in watts. Electrical energy then periodically flows from power-coil winding 13a and through transistor 14. Trigger energy also periodically flows through variable potentiometer 15 and resistor 16. Clamping diode 17 clamps the reverse base-emitter voltage of transistor switch 14 at a safe reverse-bias level that does not damage the transistor 14. Energy flows to stator 18a and pole piece 18b, an extension of stator 18a. Pole piece 18b is electrically magnetized only when transistor switch 14 is on and maintains the same polarity as the rotor poles 19—here North pole—when electrically magnetized. The North rotor poles 19a, 19b and 19c, which are attached to rotor 20, come in momentary apposition with pole piece 18b creating a momentary monopole interface. The poles 19a,b,c, which are actually permanent magnets with their North poles facing outward from the rotor 20, maintain the same polarity when in momentary apposition with pole piece 18b. Rotor 20 is attached to rotor shaft 21, which has drive pulley 22. Attached to rotor shaft 21 are rotor-shaft bearing blocks 31a and 31b, as seen in FIG. 2. As rotor 20 begins to rotate, the poles 19a,b,c respectively comes in apposition with magnetized pole piece 18b in a momentary monopole interface with energy flowing through diode bridge rectifier 23 and capacitor 24. The number of capacitors may be of a wide range, depending upon the amount of energy to be temporarily stored before being expelled or flash charged into recovery battery 29. Timing belt 25 connects drive pulley 22 on timing shaft 21 to timing wheel 26. Attached to timing wheel 26 is contact rotor 27, a copper insulated switch that upon rotation, comes in contact with brushes on mechanical switch 28. The means for counting the number of rotor revolutions may be a timing gear or a timing belt. Finally, the available energy derived from the back EMF that is stored in capacitor 24 is then discharged and stored in recovery battery 29.

FIG. 2 is a mechanical perspective top view of the monopole motor of the instant invention without electrical circuitry. Stator 18a consists of coil 13, which is comprised of three separate coil windings: power-coil winding 13a, trigger-coil winding 13b and recovery-coil winding 13c. Pole piece 18b is at the end of stator 18a. As rotor 20, which is attached to rotor shaft 21, rotates, each pole 19 respectively comes in a momentary monopole interface with pole piece 18b. The polarity of pole piece 18b is constant when electrically magnetized. Rotor shaft 21 has rotor shaft bearing blocks 31a,b attached to it for stabilization of rotor shaft 21. Attached to rotor shaft 21 is drive pulley 22 with timing belt 25 engaged onto it. Another means for timing may be a timing gear. Timing belt 25 engages timing wheel 26 at its other end. Timing wheel 26 is attached to timing shaft 30. Shaft 30 is stabilized with timing shaft bearing blocks 32a,b. At one end of timing shaft 30 is contact rotor 27 with brush 28a, which, upon rotation of timing shaft 26, comes into momentary contact with brushes 28b,c.

Figure 3:
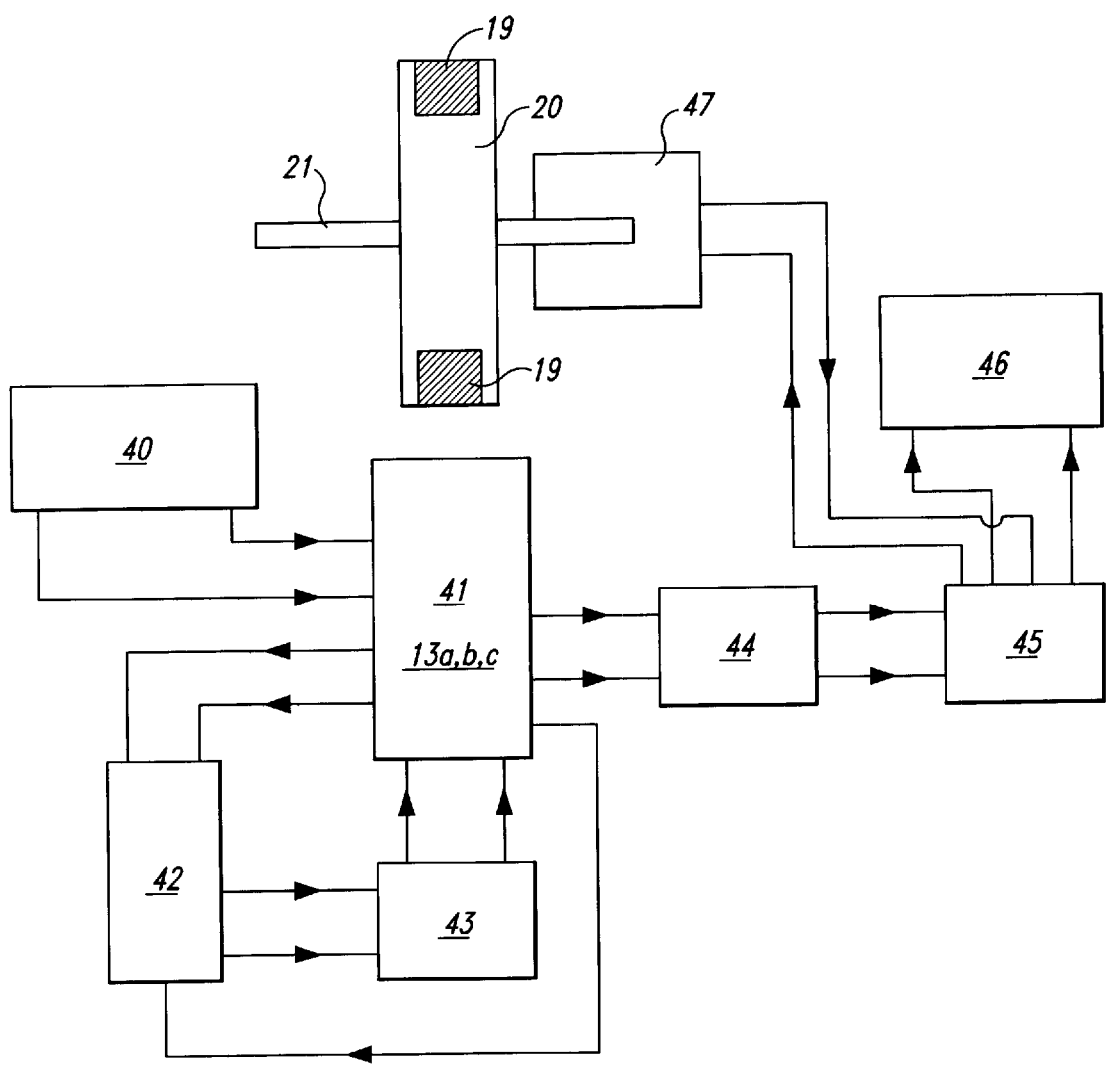
FIG. 3 is a block diagram demonstrating the circuitry for a monopole back EMF motor.

FIG. 3 is a block diagram detailing the circuitry of the monopole motor. Block 40 represents primary battery 11 with energy flowing to coil block 41, which represents coil windings 13*a,b,c*. From coil block 41 energy flows into three directions: to trigger-circuit block 42, transistor-circuit block 43, and rectifier-circuit block 44. Energy flows from rectifier-block 44 to storage-capacitor block 45 with energy flowing from block 45 to both recovery-battery block 46 and rotor-switch block 47.

Referring to FIG. 1, the operation of the motor is described according to an embodiment of the invention. For purpose of explanation, assume that the rotor 20 is initially not moving, and one of the poles 19 is in the three o'clock position.

First, one closes the switch 12. But because the transistor 14 is off, no current flows through the winding 13*a*.

Next, one starts the motor by rotating the rotor 20, for example in a clockwise rotation. One may rotate the rotor by hand, or with a conventional motor-starting device or circuit (not shown).

As the rotor 20 rotates, the pole 19 rotates from the three o'clock position toward the pole piece 18*b* and generates a magnetic flux in the windings 13*a*–13*c*. More specifically, the stator 18*a* and the pole piece 18*b* include a ferromagnetic material such as iron. Therefore, as the pole 19 rotates nearer to the pole piece 18*b*, it magnetizes the pole piece 18*b* to a polarity—here South—that is opposite to the polarity of the pole 19—here North. This magnetization of the pole piece 18*b* generates a magnetic flux in the windings 13*a*–13*c*. Furthermore, this magnetization also causes a magnetic attraction between the pole 19 and the pole piece 18*b*. This attraction pulls the pole 19 toward the pole piece 18*b*, and thus reinforces the rotation of the rotor 20.

The magnetic flux in the windings 13*a*–13*c* generates respective voltages across the windings. More specifically, as the pole 19 rotates toward the pole piece 18*b*, the magnetization of the stator 18*a* and the pole piece 18*b*, and thus the flux in the windings 13*a*–13*c*, increase. This increasing flux generates respective voltages across the windings 13*a*–13*c* such that the dotted (top) end of each winding is more positive than the opposite end. These voltages are proportional to the rate at which the flux is increasing, and thus are proportional to the velocity of the pole 19.

At some point, the voltage across the winding 13*b* becomes high enough to turn on the transistor 14*c*. This turn-on, i.e., trigger, voltage depends on the combined serial resistance of the potentiometer 15 and the resistor 16. The higher this combined resistance, the higher the trigger voltage, and vice-versa. Therefore, one can set the level of the trigger voltage by adjusting the potentiometer 15.

In addition, depending on the level of voltage across the capacitor 24, the voltage across the winding 13*c* may be high enough to cause an energy recovery current to flow through the winding 13*c*, the rectifier 23, and the capacitor 24. Thus, when the recovery current flows, the winding 13*c* is converting magnetic energy from the rotating pole 19 into electrical energy, which is stored in the capacitor 24.

Once turned on, the transistor 14 generates an opposing magnetic flux in the windings 13*a*–13*c*. More specifically, the transistor 14 draws a current from the battery 11, through the switch 12 and the winding 13*b*. This current increases and generates an increasing magnetic flux that opposes the flux generated by the rotating pole 19.

When the opposing magnetic flux exceeds the flux generated by the rotating pole 19, the opposing flux reinforces the rotation of the rotor 20. Specifically, when the opposing flux—which is generated by the increasing current through the winding 13*a*—exceeds the flux generated by the pole 19, the magnetization of the pole piece 18 inverts to North pole. Therefore, the reverse-magnetic pole piece 18 repels the pole 19, and thus imparts a rotating force to the rotor 20. The pole piece 18 rotates the rotor 20 with maximum efficiency if the pole-piece magnetization inverts to North when the center of the pole 19 is aligned with the center of the pole piece. One typically adjusts the potentiometer 15 to set the trigger voltage of the transistor 14 at a level that attains or approximates this maximum efficiency.

The transistor 14 then turns off before the opposing flux can work against the rotation of the rotor 20. Specifically, if the pole piece 18 remains magnetized to North pole, it will repel the next pole 19 in a direction—counterclockwise in this example—opposite to the rotational direction of the rotor 20. Therefore, the motor turns the transistor 14, and thus demagnetizes the pole piece 18, before this undesirable repulsion occurs. More specifically, when the opposing flux exceeds the flux generated by the pole 19, the voltage across the winding 13*b* reverses polarity such that the dotted end is less positive than the opposite end. The voltage across the winding 13*b* decreases as the opposing flux increases. At some point, the voltage at the base of the transistor decreases to a level that turns off the transistor 14. This turn-off point depends on the combined resistance of the potentiometer 15 and resistor 16 and the capacitance (not shown) at the transistor base. Therefore, one can adjust the potentiometer 15 or use other conventional techniques to adjust the timing of this turn-off point.

The rectifier 23 and capacitor 24 recapture the energy that is released by the magnetic field—and that would otherwise be lost—when the transistor 14 turns off. Specifically, turning off the transistor 14 abruptly cuts off the current that flows through the winding 13*a*. This generates voltage spikes across the windings 13*a*–13*c* where the dotted ends are less positive than the respective opposite ends. These voltage spikes represent the energy released as the current-induced magnetization of the stator 18*a* and the pole piece 18*b* collapses, and may have a magnitude of several hundred volts. But as the voltage spike across the winding 13*c* increases above the sum of the two diode drops of the rectifier 23, it causes an energy-recovery current to flow through the rectifier 23 and the voltage across the capacitor 24 charge the capacitor 24. Thus, a significant portion of the energy released upon collapse of the current-induced magnetic field is recaptured and stored as a voltage in the capacitor 24. In addition, the diode 17 prevents damage to the transistor 14 by clamping the reverse base-emitter voltage caused by the voltage spike across the winding 13*b*.

The recaptured energy can be used in a number of ways. For example, the energy can be used to charge a battery 29. In one embodiment, the timing wheel 26 makes two revolutions for each revolution of the rotor 20. The contact rotor 27 closes a switch 28, and thus dumps the charge on the capacitor 24 into the battery 29, once each revolution of the wheel 26. Other energy-recapture devices and techniques can be used as well.

One can stop the rotor 20 by braking it or by opening the switch 12.

Other embodiments of the monopole motor are contemplated. For example, instead of remaining closed for the entire operation of the motor, the switch 12 may be a conventional optical switch or a Hall switch that opens and closes automatically at the appropriate times. To increase the power of the motor, one can increase the number of stators 18a and pole pieces 18b, the number of poles 19, or both. Furthermore, one can magnetize the stator 18a and pole piece 18b during the attraction of the pole 19 instead of or in addition to magnetizing the stator and pole piece during the repulsion of the pole 19. Moreover, the stator 18a may be omitted such that the coil 13 has an air coil, or the stator 18a and the pole piece 18b may compose a permanent magnet. In addition, although the transistor 14 is described as being a bipolar transistor, it may be a MOS transistor. Furthermore, the recaptured energy may be used to recharge the battery 11. In addition, although described as rotating in a clockwise direction, the rotor 20 can rotate in a counter-clockwise direction. Moreover, although described as attracting a rotor pole 19 when no current flows through winding 13a and repelling the pole 19 when a current flows through winding 13a, the pole piece 18b may be constructed so that it attracts the pole 19 when a current flows through winding 13a and repels the pole 19 when no current flows through winding 13a.

In multiple stator/rotor systems, each individual stator may be energized one at a time or all of the stators may be energized simultaneously. Any number of stators and rotors may be incorporated into the design of such multiple stator/rotor monopole motor combinations. However, while there may be several stators per rotor, there can only be one rotor for a single stator. The number of stators and rotors that would comprise a particular motor is dependent upon the amount of power required in the form of watts. Any number of magnets, used in a monopole fashion, may comprise a single rotor. The number of magnets incorporated into a particular rotor is dependent upon the size of the rotor and power required of the motor. The desired size and horse power of the motor determines whether the stators will be in parallel or fired sequentially. Energy is made accessible through the capturing of available energy from the back EMF as a result of the unique circuitry and timing of the monopole motor. Individual motors may be connected in sequence with each motor having various combinations of stators and rotors or in parallel. Each rotor may have any number of rotor magnets, all arranged without change of polarity. The number of stators for an individual motor may also be of a wide range.

One feature that distinguishes this motor from all others in the art is the use of monopole magnets in momentary apposition with the pole piece of the stator maintaining the same polarity when magnetized. In this particular embodiment, there are three magnets and one pole piece, said pole piece an extension of a permanent-magnet stator. Finally, although the invention has been described with reference of particular means, materials and embodiments, it is to be understood that the invention is not limited to the particulars disclosed and extends to all equivalents within the scope of the claims.

What is claimed is:

1. A back EMF monopole motor utilizing a rotor wherein the magnets of said rotor maintain a polarity when in apposition with a stator pole piece having the polarity, said motor to capture available back EMF energy for charging and storage in a recovery device, the motor comprising:
   a. a means for producing initial energy;
   b. a means for capturing energy in the form of back EMF, said back EMF energy available as the result of a collapsing field in a coil, said coil comprised of multiple windings with said pole piece at one end of said stator of said coil, said pole piece having said polarity when magnetized and in apposition to said magnets of said rotor;
   c. a means for rectifying said back EMF energy, said means comprising a voltage bridge for transferring said energy to a capacitor for storage;
   d. a means for discharging said stored voltage across a recovery battery; and
   e. a means for counting the revolutions on said rotor.

2. The back EMF monopole motor of claim 1, wherein the means for producing the initial energy comprises a battery.

3. The back EMF monopole motor of claim 1, wherein said means for counting the revolutions on said rotor comprises a timing gear.

4. The back EMF monopole motor of claim 1, wherein said means for counting the revolutions on said rotor comprises a timing belt.

5. The back EMF monopole motor of claim 1, wherein said means for discharging collected energy comprises a rotating switching commutator, said commutator switch discharging said energy into a recovery battery, said commutator switch having the same polarity as said recovery battery.

6. A back EMF monopole motor utilizing a rotor wherein the magnets of said rotor maintain a polarity when in apposition with a magnetized stator pole piece having the polarity, said motor to capture available back EMF energy for charging and storage in a recovery device, the motor comprising:
   a. a means for producing initial energy, said means a primary input battery and a means for switching the battery, said means for switching either a solid-state switching circuitry, a magnetic Reed switch, a commutator, an optical switch, or a Hall switch;
   b. a means for capturing energy in the form of back EMF, said back EMF energy available as the result of a collapsing field in a coil, said coil comprised of multiple windings, and said pole piece at one end of said stator of said coil, said pole piece maintaining said polarity when magnetized and in apposition to said magnets of said rotor;
   c. a means for rectifying said back EMF energy, said means comprising a voltage bridge for transferring said energy to a capacitor for storage;
   d. a means for discharging said stored voltage across a recovery battery, said means a rotating contact rotor switch;
   e. a means for counting the revolutions on said rotor, said means a timing gear or timing belt;
   f. a means for switching said rotating contact rotor switch, said means comprising a rotating switching commutator.

7. A back EMF monopole motor utilizing a rotor wherein the magnets of said rotor maintain a polarity when in apposition with a stator pole piece magnetized to have the polarity, said motor to capture available back EMF energy for charging and storage in a recovery device such as a battery, the motor comprising:
   a. an initial energy input produced by a device such as a battery;
   b. said back EMF energy captured and available as the result of a collapsing field in a coil, said coil comprised of multiple windings with said pole piece having the polarity when magnetized and in apposition to said magnets of said rotor;
   c. said back EMF energy transferred by said rotor containing said magnets, which maintain the polarity and in momentary apposition with said magnetized stator pole piece having said polarity;

d. said back EMF energy rectified using a voltage bridge transferring said energy to a capacitor for storage;

e. said voltage discharged across a recovery device such as a battery for storage by means of a rotating contact rotor switch;

f. a timing belt or timing gear used to count the revolutions on said rotor; and g. a rotating switching commutator to control said rotating contact rotor switch.

8. A method of producing a back EMF monopole motor utilizing a rotor wherein magnets of said rotor retain a polarity when in apposition with a pole piece of a stator, said motor to capture available back EMF energy for charging and storage in a recovery battery, comprising the steps of:

a. producing initial energy;

b. switching a voltage to drive a motor;

c. capturing said energy in the form of back EMF, said back EMF energy available as the result of a collapsing field in a coil, said coil comprised of multiple windings and said pole piece at one end of said stator of said coil, said pole piece maintaining the polarity when magnetized and in apposition to said magnets of said rotor;

d. recovering said back EMF energy in a storage device.

9. The method of claim 8, wherein the back EMF energy is rectified by using a bridge transferring said energy to a capacitor for storage.

10. The method of claim 8, wherein voltage is discharged across a recovery battery using a rotating contact rotor switch, said switch having the same polarity as said recovery battery.

* * * * *